ASYNCHRONOUS OBJECT IDENTIFICATION SYSTEM

Filed Sept. 12, 1966 2 Sheets-Sheet 1

INVENTOR.
HIDEO MORI

BY Wallace, Kinzer & Dorn
ATTYS.

ASYNCHRONOUS OBJECT IDENTIFICATION SYSTEM

Filed Sept. 12, 1966 2 Sheets-Sheet 2

INVENTOR.
HIDEO MORI

BY Wallace, Kinzer & Dorn
ATTYS.

United States Patent Office 3,362,025
Patented Jan. 2, 1968

3,362,025

ASYNCHRONOUS OBJECT IDENTIFICATION SYSTEM

Hideo Mori, Woodland Hills, Calif., assignor to Abex Corporation, New York, N.Y., a corporation of Delaware Filed Sept. 12, 1966, Ser. No. 578,704
10 Claims. (Cl. 343—6.5)

ABSTRACT OF THE DISCLOSURE

An asynchronous identification system for identifying moving railroad cars or other objects in which each object carries a coded identification member that is scanned by microwave or other radiant energy signals as the object moves past a given reference position. Each identification member includes a plurality of first code elements that reflect the scanning signal with a substantial change in a particular characteristic, such as the signal polarization, interspersed with a plurality of second code elements that cannot reflect the scanning signal with that particular change. The arrangement of the code elements is such that a first binary value is represented by two of the first code elements located immediately adjacent each other and a second binary value is represented by a first code element positioned immediately adjacent a second code element. Two receivers are provided for receiving the reflected scanning signal, both receivers being limited to signals changed in polarization or other fundamental characteristic by the first code elements. The two receivers drive a code converter, which may constitute a simple flip-flop circuit or a bi-directional counter having a maximum count of three.

This invention relates to a new and improved system for automatic identification of moving objects and to a new and improved form of identification member to be utilized in such a system. The invention is particularly advantageous as applied to the identification of railroad cars, locomotives, and like vehicles, but can also be applied to identification of other objects. In the following specification, the invention is described as applied to a microwave signal apparatus, but many of the advantages of the invention may be obtained in systems using other forms of radiant energy, including light in the visible spectrum.

A number of different systems have been proposed for automatic identification of individual objects. In the railroad field, in particular, there has been substantial competition in the presentation of systems for identifying freight cars and other railroad vehicles to enable railroad management to maintain continuous records as to the location of rolling stock and the service requirements of their vehicles. Some of these systems employ microwave radiation, directed toward a coded identification member; the microwave signal is reflected, in accordance with a code pattern on the identification member, to identify the vehicle or other object on which the identification member is mounted. Systems of this kind are described and claimed in Patent No. 3,247,508 to Bradford et al. and in Patent No. 3,247,509 to Hamann et al. Other systems, utilizing radiant energy signals in the visible spectrum and in other portions of the spectrum such as the infra-red, have also been proposed.

In automatic object identification systems of the general kind described above, binary coding of the identification members mounted upon the objects to be identified has many advantages. In synchronous systems, however, in which definite signals are reflected to the scanning apparatus for only one binary value, usually the binary "ones" the advantages of binary coding are frequently difficult to realize to the fullest extent. Thus, in automatic object identification systems requiring synchronous detection of the code signals reflected from the identification members on the objects, erratic readings may result when the scanning rate, usually determined by the speed of movement of the object past a scanning point, is relatively slow. Errors also appear if the scanning rate is varied while a signal object is being identified or during identification of a series of objects. The fundamental reason for these errors is that, in systems of this kind, it is not usually practical to provide a continuous timing track to determine precisely the location of the binary zeros.

A truly asynchronous system, in which positive signals are provided for both binary values, effectively eliminates many of the errors presented by timing problems in a synchronized system. Asynchronous systems have been proposed, in which the different binary values are distinguished from each other by the polarization of the reflected signals from the objects being identified or by the wavelength of the reflected signals. The most usual example of wavelength distinction, in this regard, is based upon the color of the reflected light in a system operating in the visible spectrum. In many of these asynchronous systems, however, it is difficult to assure adequate differentiation between the different signals identifying the binary values "zero" and "one." Moreover, in a system in which the polarization of the received signal distinguishes binary "ones" from binary "zeroes" there is a distinct sacrifice of the noise-eliminating advantages that can be achieved by full rotation of the signal polarization for all code values. There may also be some difficulty in achieving adequate distinction between the different binary values where two different colors must be received, using radiant signals in the visible spectrum.

It is an object of the present invention, therefore, to provide a new and improved asynchronous automatic object identification system, utilizing passive coded reflectors on the objects being identified, that functions on the basis of a single form of received signal.

A specific object of the invention is to provide a new and improved asynchronous automatic object identification system that is applicable equally to microwave signal apparatus or to other forms of radiant signal apparatus, including those utilizing signals in the visible spectrum, in which all identification data is derived from a single form of received radiant signal.

Another object of the invention is to provide a new and improved coded identification member for an asynchronous automatic object identification system that affords a unique code structure in which binary code values are represented solely by the relative positions of a single basic form of reflector element.

A further object of the invention is to provide a new and improved decoding apparatus for an automatic object identification system that permits asynchronous operation of the system, in conjunction with position-coded identification members.

A specific object of the invention is to obtain substantial immunity to differences in speed and variations in speed in the scanning of coded identification members in an automatic object identification system.

Accordingly, the invention is directed to an asynchronous automatic object identification system; such a system, constructed in accordance with the invention, comprises a source of a radiant energy signal of given fundamental characteristics, and radiating means for radiating that signal toward an object to be identified. The system further comprises a plurality of coded identification members, at least one for each object. Each identification member includes a plurality of first code elements for reflecting the radiant energy signal along a reference path but with a substantial change in a given one of the fundamental characteristics of the signal and a plurality of second code elements incapable of reflecting the radiant energy signal back along that path with a corresponding change in the aforesaid one fundamental characteristic. The first and second code elements are interspersed with each other in a code pattern in which a first binary value is represented by two of the first code elements positioned immediately adjacent each other and in which a second binary value is represented by a first code element positioned immediately adjacent a second code element. The system further comprises a pair of independent receiving means positioned to receive radiant energy signals reflected from the identification member code elements along the reference path, each of the receiving means being limited to the reception of signals substantially changed in the aforesaid one fundamental characteristic. Code conversion means are provided in the system, coupled to both of the receiving means, for combining the received radiant signals to decode the binary identification data of the identification members. In the preferred form, the code conversion means comprises a simple bi-directional counter.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

Figure 1:
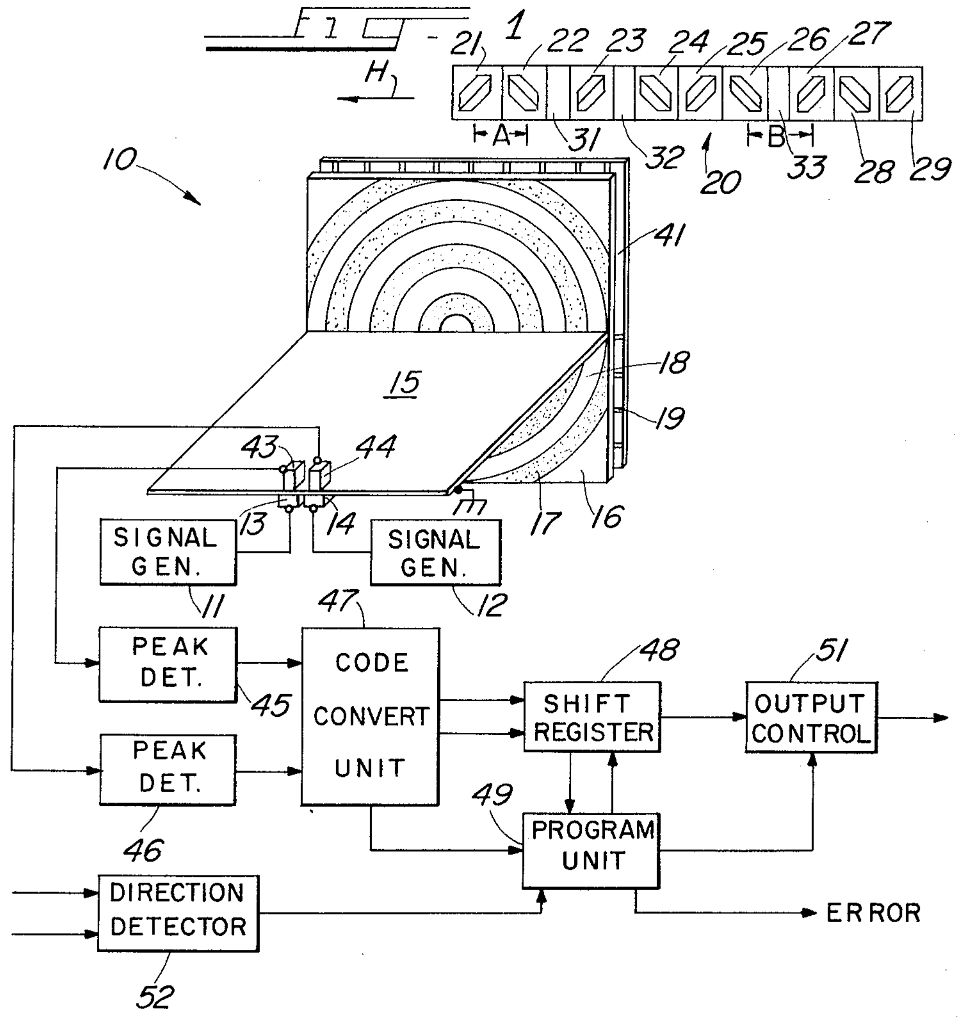
FIG. 1 is a schematic block diagram of an asynchronous automatic object identification system constructed in accordance with one embodiment of the present invention.
Figures 3, 4, 5:
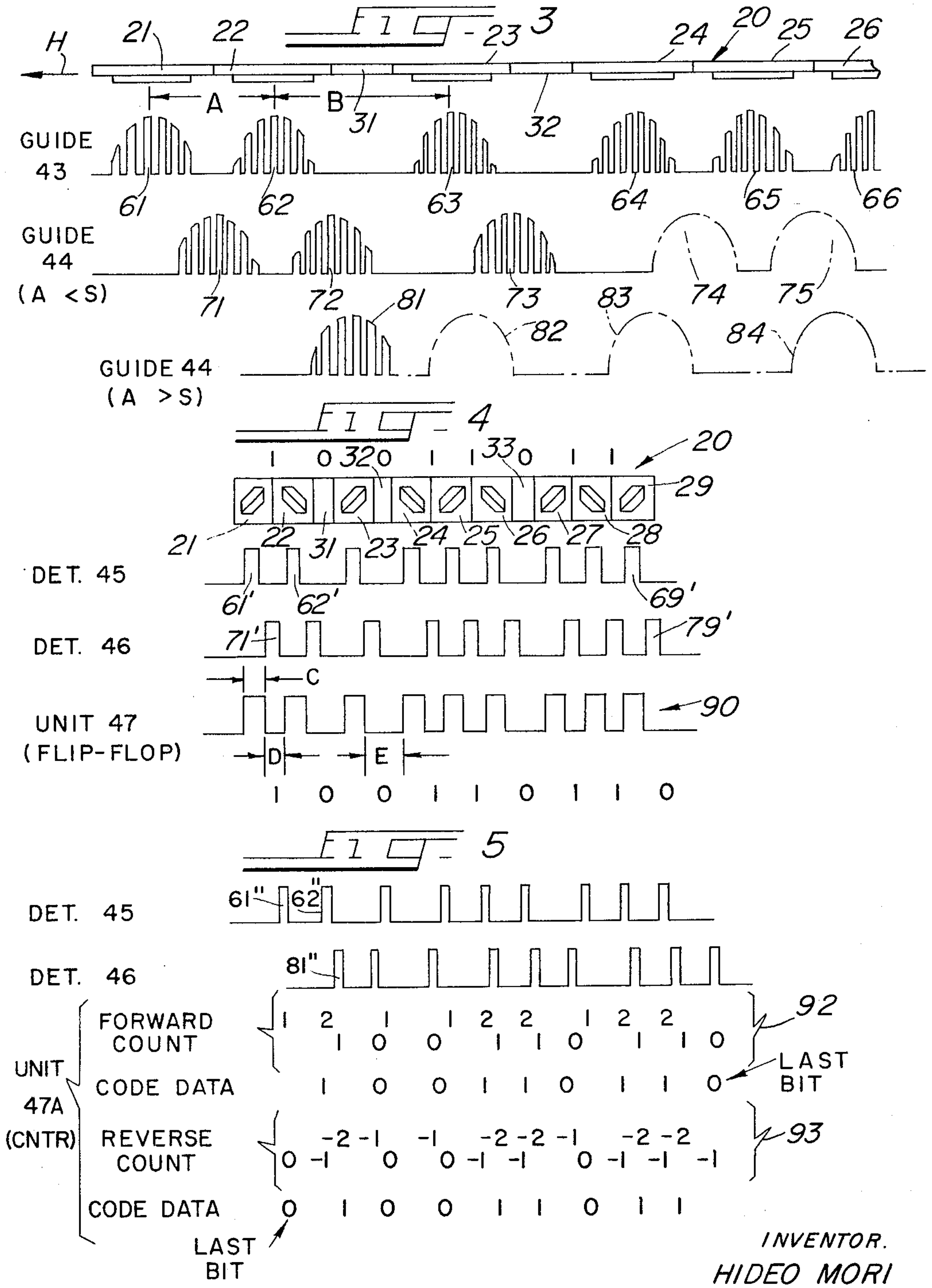
FIG. 3 illustrates the wave forms for signals developed by the receiving means of the system of FIG. 1.

FIG. 4 comprises a series of waveform diagrams illustrating the time relationship between signals developed by the receiving means in one decoding arrangement for the automatic identification system of FIG. 1; and FIG. 5 is a chart illustrating the time relation of pulse signals and the operation of a decoding counter in a preferred embodiment of the system of FIG. 1.

FIG. 1 illustrates, in schematic block diagram form, an atuomatic object identification system 10 constructed in accordance with the present invention. System 10 comprises a source of radiant energy signals of given fundamental characteristics. The specific arrangement illustrated in FIG. 1 includes two such signal sources, a first signal generator 11 and a second signal generator 12. The operating frequency for the two signal generators 11 and 12 is not critical to the present invention; the signal generators may be assumed to be microwave oscillators operating, for example, at a frequency of the order of thirty kilomegacycles. It is not essential that two separate signal generators be provided; a single signal generator may be utilized if desired.

The first signal generator 11 is connected to a first radiating means, in this instance comprising a wave guide 13. Similarly, signal generator 12 is coupled to a radiating means comprising a wave guide 14. Each of the wave guides 13 and 14 is constructed to radiate the signal from its respective signal source with a given initial polarization. In the particular construction illustrated in FIG. 1, each of wave guides 13 and 14 radiates the microwave signal with horizontal polarization; any other initial polarization could be selected as desired.

Wave guides 13 and 14 are mounted upon one side of a horizontally extending conductive planar septum 15 that extends from the wave guides to the center of a zone plate lens 16. Lens 16 may comprise a plurality of concentric conductive bands 17 on a dielectric base, so that the conductive bands are interspersed with dielectric bands 18; this lens structure is described in detail in aforementioned Patent No. 3,247,508 of Bradford et al. A polarization grid 19, which may also be constructed of conductive bands on a dielectric support, may be disposed adjacent the lower half of lens 16 to further limit the radiated signals to the desired horizontal polarization.

The asynchronous automatic object identification system 10 further includes a plurality of coded identification members, one mounted upon each object to be identified. In FIG. 1, one such object identification member 20 is illustrated; it will be understood that the system would include a substantial additional number of identification members each bearing its own particular identification code.

Identification member 20 comprises a first series of code elements 21, 22, 23, 24, 25, 26, 27, 28 and 29. Each of these first code elements 21–29 comprises an individual reflector for reflecting the incident microwave signal from lens 16 along a reference path toward the lens system.

The first reflector code elements 21–29 must effect a substantial change in some fundamental characteristic of the radiated signal. In the arrangement illustrated in FIG. 1, this is a change in polarization. Thus, each of the first code elements 21–29 may comprise a corner reflector having its apexial axis at an angle of 45° relative to the horizontal and thus at an angle of 45° relative to the initial direction of polarization of the radiated signals. A reflector of this kind reflects impinging radiant energy signals, including microwave signals, with a change in polarization of 90°. Hence, the signals reflected back toward the lens 16 are vertically polarized instead of horizontally polarized.

Alternate ones of the reflector code elements 21–29 may have their apexial axes normal to each other, as shown in FIG. 1, to achieve the benefits of a pseudo mono-pulse operation as described in Patent No. 3,247,-510 to Molnar et al. Moreover, the reflector code elements are not limited to a single corner reflector for each element but may each include a plurality of individual corner reflectors as in the construction described and claimed in application Ser. No. 498,795 of Hideo Mori, filed Oct. 20, 1965, now Patent No. 3,311,915.

In addition to the positive reflector elements 21–29, identification member 20 includes a plurality of second code elements 31, 32 and 33. Code elements 31–33 are passive code elements and may be constructed of material capable of absorbing the impinging microwave or other radiant energy signals without substantial reflection. On the other hand, an absorbent construction is not essential and the passive code elements can be constructed in any form that is not effective to reflect the impinging microwave signals with the same change in fundamental characteristic as afforded by the reflector code elements 21–29. Thus, a smooth reflective surface that makes no change in polarization of the reflected signal, as compared with the impinging signal, can be employed.

The first (positive) code elements 21–29 and the second (passive) code elements 31–33 are interspersed with each other in a code pattern in which a given binary value, in this instance a binary "one," is represented by the positioning of two of the first code elements immediately adjacent to each other. Thus, code elements 21 and 22 conjointly define a binary one. Similarly, code elements 24 and 25 define a binary one and code elements 25 and 26 indicate a binary one.

In this code pattern, the alternate binary value, binary zero, is represented by one of the code elements from the first series positioned immediately adjacent a code element from the second series. That is, code elements 22 and 31 conjointly indicate a binary zero, code elements 23 and 32 identify a binary zero, and code elements 26 and 33 indicate a binary zero. The same relationship obtains if identification member 20 is scanned from right to left instead of from left to right, so that code elements 27 and 33 represent a binary zero for the reverse direction of scanning. The code number for identification member 20 is thus 10011011.

The radiant signals reflected from identification member 20 pass through a second polarization grid 41 and through the upper half of lens 16 to impinge upon two receiving wave guides 43 and 44. Polarization grid 41 is oriented to pass only vertically oriented microwave signals and assists in preventing cross-talk between the transmitting and receiving portions of the identification system.

Wave guide 43 is a part of a first receiving means limited to reception of signals reflected from the identification member 20 with a substantial change in one fundamental characteristic, in this instance the signal polarization, relative to the initial radiated signal. Wave guide 43 is connected to a peak detector 45 that is a part of the receiving means, the output of detector 45 in turn being coupled to a code converter 47. Similarly, wave guide 44 is coupled to a peak detector 46 that is in turn connected to the code conversion unit 47. The code conversion unit 47 includes two output circuits, one for binary zeros and the other for binary ones, both connected to a shift register 48. The code conversion unit is also provided with an output connection to a program unit 49 that is interconnected with shift register 48. An output signal from the shift register 48 is derived through an output control circuit 51 actuated by program unit 49. The output signal may be in ordinary binary code or in any standardized code for infromation handling purposes.

Effective operation of system 10 depends in part upon identification of the direction of movement of the identification member 20 past the transmitting and receiving station of the system. This information is provided by a direction detector circuit 52. If the identification system 10 is applied to the identification of freight cars or other railroad vehicles, the direction detector circuit 52 may advantageously be constructed in the form described and claimed in the copending application of Hideo Mori, Ser. No. 563,099, filed July 6, 1966, entailing two input signals from trackside detector switches or similar detector devices. However, any other form of direction detecting apparatus may be employed if desired, including direction-coding of the identification members. Of course, if the objects always move past the scanning position in a given direction, the direction detector may be superfluous. This is equally true if the system affords some means to deflect the radiated signals to achieve a scanning action rather than depending on movement of the object past the scanning position.

Figure 2:
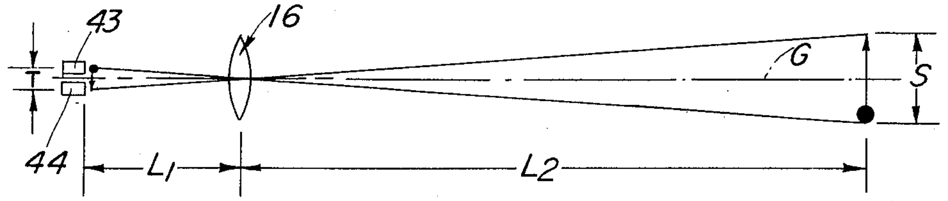
FIG. 2 is a simplified optical diagram illustrating certain operating relations in the system of FIG. 1.

FIG. 2 is a schematic illustration of the basic optical arrangement for the identification system 10 of FIG. 1. As shown therein, lens 16 has a focal length L1, on the side adjacent the receiving wave guides 43 and 44, that is substantially smaller than the focal length L2 on the side opposite the receiving wave guides. This differential is not essential to the system of the present invention but is typical of the many object identification systems and particularly of railroad car identification systems. In a given system, for example, the length L2 may be of the order of thirty-three inches and the length L1 of the order of eleven inches, so that the ratio of L2 to L1 is approximately 3:1.

The two receiving wave guides 43 and 44 are disposed on opposite sides of the central axis G of lens system 16, the center-to-center spacing between the two wave guides being indicated in FIG. 2 as the spacing T. The corresponding distance at the opposite focal plane of the lens is repeated in FIG. 2 by the spacing S. The relationship of the spacing S to the center-to-center spacing A between two adjacently mounted reflector code elements such as code elements 21 and 22 in FIG. 1 determines in part the requirements for the decoding apparatus of the system, as described hereinafter. Another important relation is that between the spacing S and the center-to-center spacing of reflector elements in the identification member where a blank code element is interposed between two reflector code elements, as indicated by the center-to-center distance B between the reflector code elements 26 and 27 in FIG. 1.

FIG. 3 illustrates the wave forms derived by the receiving means comprising wave guides 43 and 44 for the reflected signals from the identification member 20 with the identification member moving from right to left past the scanning apparatus as shown by the arrows H in FIGS. 1 and 3. As illustrated in FIG. 3, when the first reflector code element 21 moves past the scanning apparatus, the wave guide 43 receives a burst of high frequency signals 61, the peak of the signal burst corresponding to the movement of the center of the reflector code element 21 past the lens system. A similar signal burst 62 is developed at wave guide 43 by the movement of reflector code element 22 across the scanning point in front of the lens system. The blank code element 31 does not produce a signal on wave guide 43, and this is equally true with respect to the passive code element 32. However, individual bursts of high frequency signal are developed on the wave guide 43 by the passage of each of the reflector code elements 23, 24, 25 and 26, as indicated by pulses 63, 64, 65 and 66, respectively.

The construction of the optical system for the automatic identification apparatus can be arranged such that the reflected signal from the first reflector code element 21 that impinges upon wave guide 44 occurs immediately after the signal on wave guide 43 developed by the same reflector code element. This condition occurs when the center-to-center spacing A of the reflector code elements is substantially smaller than the effective spacing S corresponding to the wave guide spacing at the opposite focal plane of the lens (FIG. 2). For this condition, the signal developed by wave guide 44 comprises the signal bursts 71, 72, 73, 74, and 75 in FIG. 3, these pulses being on the same time scale as pulses 61–66.

On the other hand, effective decoding can also be accomplished with a different relationship between the narrowest possible center-to-center spacing A of the reflector elements and the effective spacing S between the receiving means as projected to the opposite focal plane of the lens system. That is, the minimum spacing A between the centers of the reflector code elements may be made slightly larger than the distance S. If this is done, the signal developed at wave guide 44 comprises the bursts 81, 82, 83 and 84 (FIG. 3) which are the same as pulses 71–75 but displaced in time to a different relationship as regards the pulses 61–66 developed at wave guide 43.

FIG. 4 illustrates the complete pulse trains developed by the detectors 45 and 46 in response to the signal inputs to the peak detectors from wave guides 43 and 44 respectively, corresponding to the condition where spacing A is smaller than spacing S. In FIG. 4, the output of detector 45 comprises the pulse train 61′–69′ and the output from detector 46 is the pulse train 71′–79′. Each pulse in the output from detector 46 occurs almost immediately after the corresponding pulse in the output from detector 45 and well before any subsequent pulse from detector 45 caused by the next reflector code element to pass the scanning system. This is clearly illustrated by the relationship between pulses 61′, 71′, and 62′, for example.

With the signal conditions illustrated in FIG. 4, code converter 47 may comprise a flip-flop circuit which is triggered to one conductive state by an input signal from detector 45 and to the opposite conductive state by a signal from detector 46. In the resulting pulse train 90 all of the positive-going pulses are of uniform width *c*; they are not directly indicative of the binary information with which the identification member 20 is encoded. But there is a distinct difference in the widths of the negative-going pulses in the signal wave form 90.

Thus, as noted above, a binary one, on the identification member 20, is represented by two reflector code elements disposed immediately adjacent to each other. This combination, in the output signal 90 from the flip-flop circuit comprising converter 47 for this embodiment of the invention, produces a narrow negative-going pulse having a width D. A binary zero, on the other hand, is represented by a reflector code element positioned immediately adjacent a blank code element and produces a negative-going pulse of substantially greater duration having a width indicated at E. That is, it is the relative widths or durations for the negative-going pulses in signal 90 that contain the binary code information that is required to interpret the data from the identification member 20. It will be recognized that the relative widths of these pulses, widths D and E, can be detected with little difficulty to afford the necessary identification information.

For accurate interpretation of the wave form 80 produced in the arrangement described above in connection with FIG. 4, it is necessary to adjust the circuit to reflect changes in the rate of movement of the identification member past the scanning apparatus.

FIG. 5 illustrates the signal conditions in an arrangement predicated upon the relation described above for the pulse signal 81–84 (FIG. 3) in which the minimum center spacing A of the reflector code elements is somewhat greater than the effective spacing S between the receiving means as projected to the opposite focal plane of the lens system. In this instance, as shown in FIG. 5, the pulse signals developed by detector 45 for two immediately adjacent reflector code elements, such as the pulses 61″ and 62″, occur before the first corresponding pulse 81″ developed by detector 46.

Figure 1A:
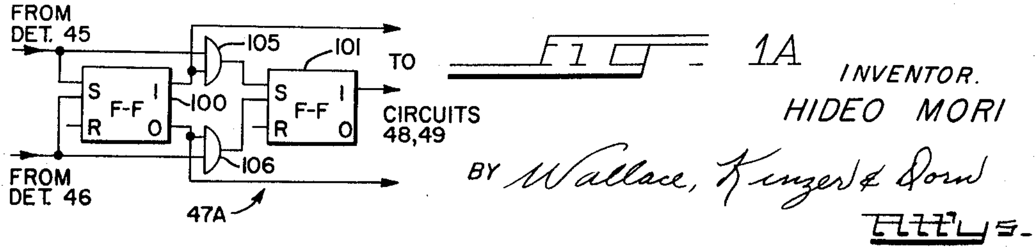
FIG. 1A is a simplified block diagram of a bi-directional counter utilized as a code conversion unit in a modification of the system of FIG. 1.

Interpretation of the output signals from detectors 45 and 46 for the conditions illustrated in FIG. 5 may be accomplished by use of a code converter unit, in place of the original converter 47, that constitutes a simple two-stage bi-directional binary counter. A typical bi-directional counter 47A of conventional construction, comprising two flip-flop circuits 100 and 101, is illustrated in FIG. 1A. Flip-flop circuit 100 has two "set" inputs, one connected to detector 45 and the other to detector 46. One output of flip-flop 100 is connected to an AND circuit 105 that also receives the pulse signals from detector 45, AND circuit 105 being connected to one "set" input of flip-flop 101. Similarly, an AND circuit 106 connects the other output of flip-flop 100 and the detector 46 to a second "set" input terminal of flip-flop 101. The outputs of the two flip-flop circuits are coupled to shift register 48 and to program unit 49. The flip-flops 100 and 101 are both of the conventional type in which the triggering action of the flip-flop occurs when the input signal returns to zero following an input pulse. In this construction, the pulses from detector 45 actuate the counter 47A to count upwardly and the pulses from detector 46 actuate the counter to count downwardly. Assuming the direction of movement of identification member 20 in accordance with the arrow H (FIGS. 1 and 3) to represent "forward movement," the counting conditions in the counter are as illustrated graphically at 92 in FIG. 5.

For such "forward movement" of the identification member, the following table illustrates the operation of the counter and the interpretation of the binary data from the pulse signals as derived by the counter:

| Count in counter unit 47A: | Binary code significance |
|---|---|
| 0 | 0 |
| 1 | Immaterial |
| 2 | 1 |
| 3 | Error |

Reverse movement of the identification member, opposite the arrow H, produces the same effective result using the same counter. This is illustrated at 93 in FIG. 5, reading from right to left instead of from left to right to obtain the proper time sequence for the pulse signals. For this mode of operation of the counter, controlled by the direction detector 52 (FIG. 1) the result is:

| Count in counter unit 47A: | Binary code significance |
|---|---|
| 0 | 0 |
| −1 | Immaterial |
| −2 | 1 |
| −3 | Error |

It is thus seen that a simple two-stage binary counter employed as the code conversion unit 47A for the signal conditions illustrated in FIG. 5 accurately and effectively decodes and interprets the binary information from the identification member regardless of the direction or speed of movement of the identification member. The only necessity for separate control in relation to direction of movement is the requirement to reverse the sequence of recording in the shift register 48 (FIG. 1) to avoid reversal of the serial number carried by the identification member.

In FIG. 5, referring to the code data derived by the counter in each instance, it is seen that the final code digit, the last bit derived by the counter unit 47A, is in each instance a zero. This will always be the case for an accurate decoding operation with respect to the arrangement described above for FIG. 5, because the final reflector code element on the identification member will always appear, to the receiving apparatus, to be followed by a blank reflector element, whether there is actually a blank reflector element present on the identification member or not. This affords another basis for an effective validity check on the identification system; if the last detected digit for any serial number is not a zero, it is clear that an error has occurred and the program unit 49 produces an error output signal. Another error signal condition is the presence of a count greater than two in the counter, as detected by the programmer 49 through its connection to the code converter counter unit 47 (FIG. 1). Yet another error indication can be developed in the program unit 49 upon failure to detect a minimum number of axles between individual code words, information that can be derived from the direction detector 52. Of course, appropriate parity or other additional validity checks can be incorporated in the system as desired.

With the arrangement described in connection with FIG. 5, the identification system of the invention is virtually completely immune to differences in speed of movement of the identification member past the scanning point, including changes that may occur while a single identification member traverses the scanning point. The reason for this is that the counter arrangement for decoding the identification data is not time dependent in any way and a variation in the speed of movement of the identification member simply stretches out or condenses the time scale for the pulse signals 61″–69″ and 81″–89″.

In a microwave identification system, as generally described above in connection with FIG. 1, the substantial noise immunity afforded by rotation of the polarization of each significant reflected signal is fully preserved, since polarization of the signal is not employed to differentiate between binary ones and binary zeros. Moreover, the benefits of pseudo mono-pulse operation, with effective cancelling of interference signals between adjacent reflectors, can be utilized to the fullest extent, whereas this cannot be done effectively if a change in polarization is employed for data identification.

It is not essential, however, that a change in polarization be utilized as the distinguishing feature between radiated signal and the reflected signal in the identification system. For example, if the radiated signal includes components over a broad band of wavelengths and only a narrow band is passed back to the receiving means, a change in the wavelength characteristic of the signal can be employed. This is particularly practical for systems using optical signals identifying binary ones on the basis of a particular narrow band color reflection. Of course, systems utilizing optical signals in the visual range or in the infra-red may also employ the polarization rotation arrangement described above for the preferred microwave system.

In either a microwave system or an optical system, it is by no means essential to use two separate signal generators 11 and 12. Instead, a single signal generator can be employed. Superior results are achieved, however, with two radiating sources located in the same alignment relative to the central axis of the lens system as the two receiving means 43 and 44. For a system using light signals instead of microwave signals, it will be recognized that the individual receiving means may comprise conventional photodetector devices, with appropriate color filters or polarization filters incorporated in the lens system to distinguish over stray reflections and to limit reception to code signals from the identification members.

Hence, while preferred embodiments of the invention have been described and illustrated, it is to be understood that they are capable of variation and modification.

I claim:

1. An asynchronous automatic object identification system comprising:

a source of a radiant energy signal of given fundamental characteristics;

radiating means for radiating said signal toward an object to be identified moving past a given reference position;

a plurality of coded identification members, one for each object, each comprising a plurality of first code elements for reflecting said radiant energy signal along a given path but with a substantial change in a given one of said fundamental characteristics, and a plurality of second code elements incapable of reflecting said radiant energy signal along said path with a corresponding change in said one fundamental characteristic, said first and second code elements being interspersed with each other in a code pattern in which a first binary value is represented by two of said first code elements positioned immediately adjacent each other and a second binary value is represented by a first code element positioned immediately adjacent a second code element;

a pair of receiving means positioned to receive radiant signals reflected along said path from said identification member code elements and limited to reception of signals substantially changed in said one fundamental characteristic;

and code conversion means, coupled to both of said receiving means, for converting said received radiant signals from both receiving means into a binary identification signal.

2. An asynchronous automatic object identification system as set forth in claim 1, and further comprising lens means for directing said reflected radiant signals to said receiving means, said receiving means being disposed on opposite sides of the axis of said lens and said lens axis constituting said given path, the effective projected spacing between said receiving means, at said reference position, being greater than the minimum center-to-center spacing between adjacent first code elements of said identification member.

3. An asynchronous automatic object identification system according to claim 2 in which said code conversion means comprises a flip-flop circuit having two stable operating conditions, said flip-flop circuit being actuatable to one operating condition by a signal from a first one of said receiving means and being actuatable to its other operating condition by a signal from the other of said receiving means.

4. An asynchronous automatic object identification system as set forth in claim 1, and further comprising lens means for directing said reflected radiant signals to said receiving means, said receiving means being disposed on opposite sides of the axis of said lens and said lens axis constituting said given path, the effective projected spacing between said receiving means, at said reference position, being less than the minimum center-to-center spacing between adjacent first code elements of said identification member.

5. An asynchronous automatic object identification system according to claim 4 in which said code conversion means comprises a two-stage binary counter that counts in one direction in response to input signals from one of said receiving means and in the opposite direction in response to input signals from the other of said receiving means, the count in said counter having the following significance in decoding the identification data from said identification members:

| Count in counter: | Code significance |
|---|---|
| 0 | 0 |
| 1 | Immaterial |
| 2 | 1 |
| 3 | Error |

6. An asynchronous automatic object identification system according to claim 5 and further including direction detecting means for detecting the direction of movement of said objects past said reference position, said direction detecting means being coupled to said counter to control the direction of counting therein.

7. An asynchronous automatic object identification system according to claim 1 in which said radiant energy signal is a polarized microwave signal and in which said change in fundamental characteristic effected by said first code elements constitutes a rotation of the signal polarization through an angle of approximately 90°.

8. A coded identification member for an automatic object identification system in which individual objects are identified at a scanning station including a source of a radiant energy signal of given fundamental characteristics, radiating means for radiating said signal toward an object to be identified at a given reference position, and receiving means for receiving a reflected radiant energy signal but limited to reception of signals changed substantially in one of said fundamental characteristics from the signal radiated by said radiating means, said identification member comprising:

a plurality of first code elements, each effective to re-radiate said radiant energy signal toward said receiving means with the required change in said one fundamental characteristic, and a plurality of second code elements incapable of re-radiating said radiant energy signal to said receiving means with the required change in said one fundamental characteristic;

said first and second code elements being interspersed with each other in a code pattern in which a first binary value is represented by two of said first code elements positioned immediately adjacent each other and a second binary value is represented by a first code element positioned immediately adjacent a second code element.

9. A coded identification member for an automatic object identification system in which individual objects are identified at a scanning station including a source of a radiant energy signal of given fundamental characteristics, radiating means for radiating said signal along a given path, and receiving means for receiving a reflected radiant energy signal but limited to reception of signals changed substantially in one of said fundamental characteristics from the signal radiated by said radiating means, said identification member comprising:

a plurality of reflector code elements, each effective to reflect said radiant energy signal back to said receiving means with the required change in said one fundamental characteristic, and a plurality of blank code elements incapable of reflecting said radiant energy signal back to said receiving means with the required change in said one fundamental characteristic;

said reflector and blank code elements being interspersed with each other in a code pattern in which a first binary value is represented by two of said reflector code elements positioned immediately adjacent each other and a second binary value is represented by a reflector code element positioned immediately adjacent a blank code element.

10. A coded identification member according to claim 9 in which reflector code elements are each effective to rotate the polarization of the reflected radiant energy signal through an angle of 90° relative to the polarization of the incident signal.

No references cited.

RICHARD A. FARLEY, *Primary Examiner.*

RODNEY D. BENNETT, *Examiner.*

C. L. WHITHAM, *Assistant Examiner.*